W. WRIGHT.
COMBINED TYPE WRITING AND COMPUTING MACHINE.
APPLICATION FILED JULY 27, 1911.
1,192,255.
Patented July 25, 1916.
3 SHEETS—SHEET 1.
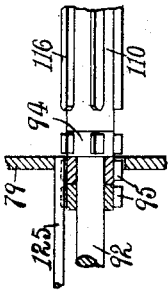
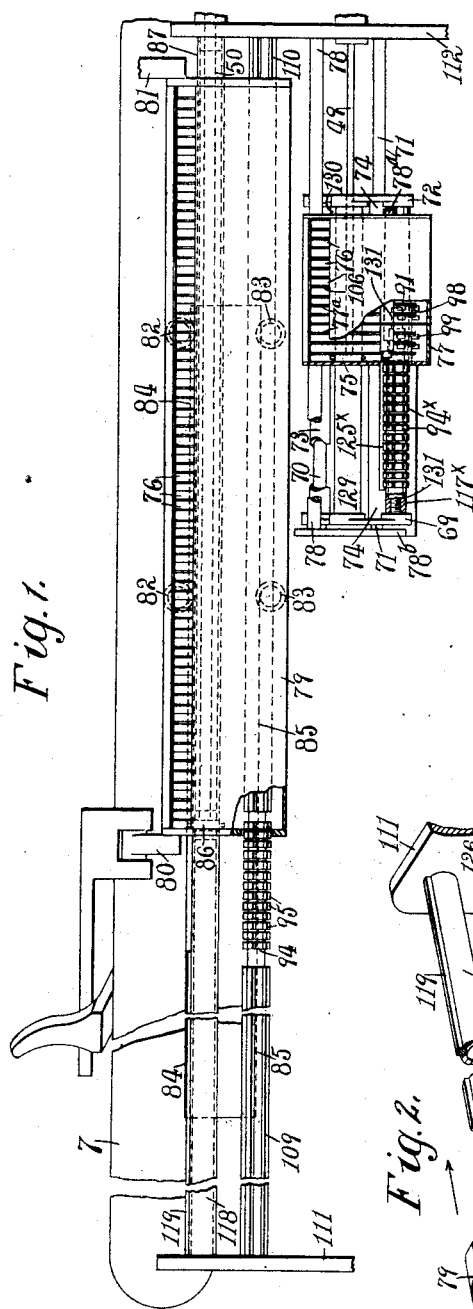

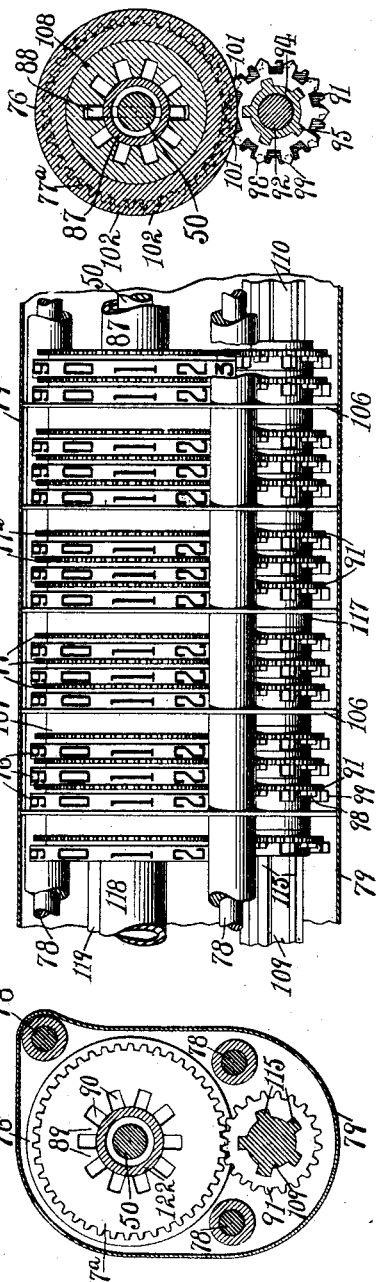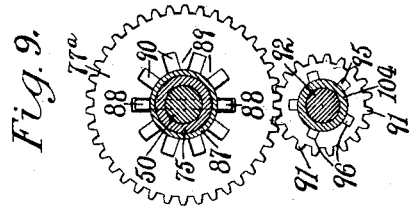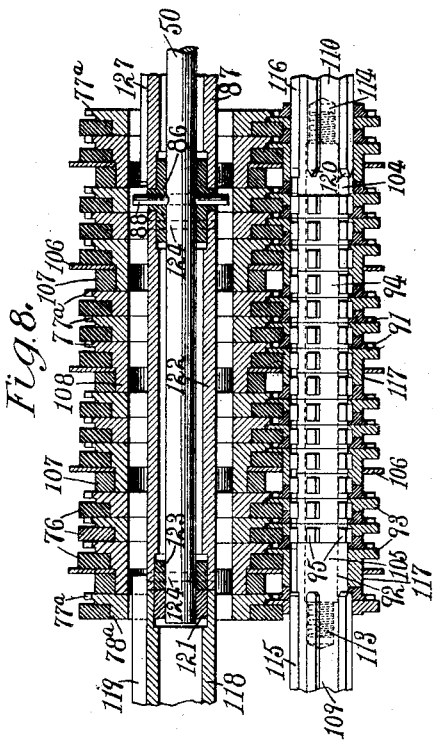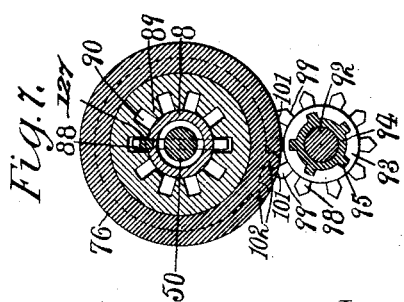

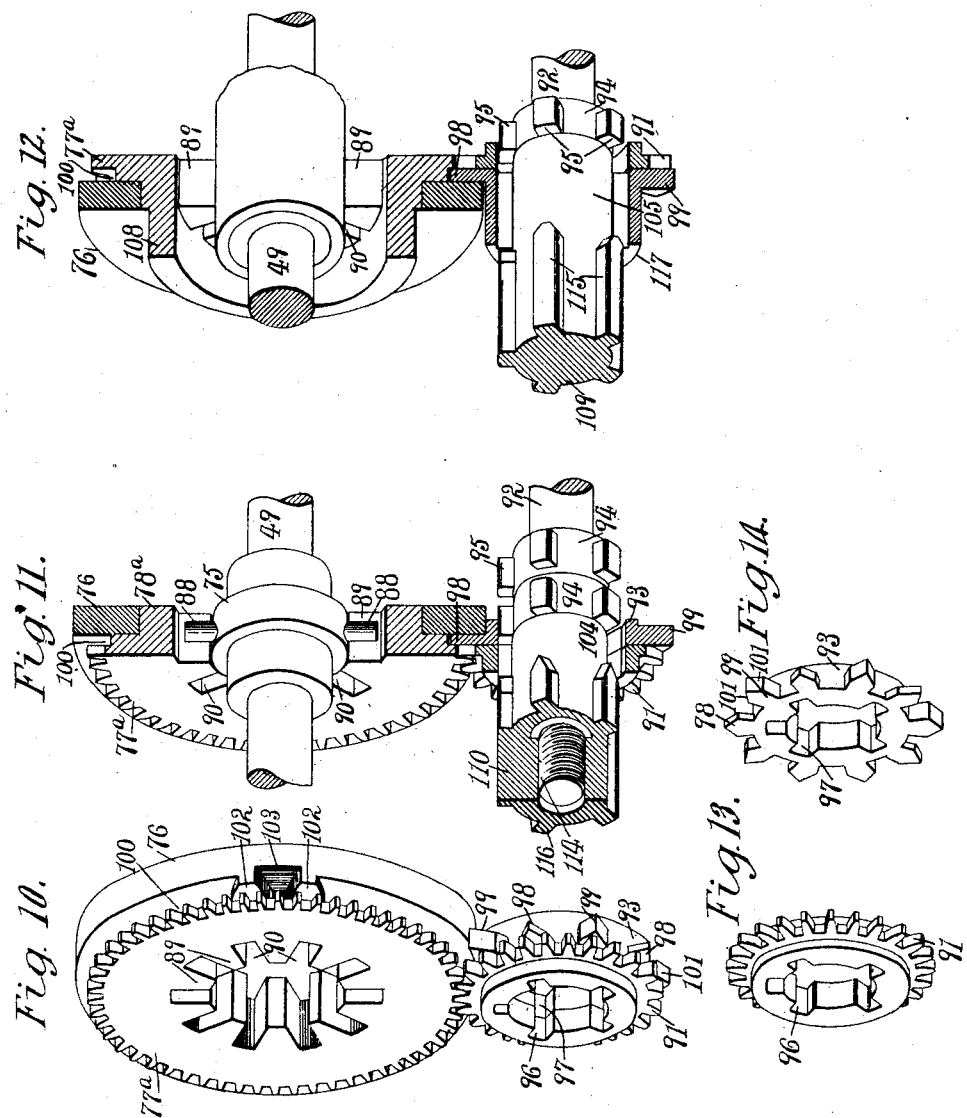

UNITED STATES PATENT OFFICE.

WALTER WRIGHT, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,192,255. Specification of Letters Patent. Patented July 25, 1916.

Application filed July 27, 1911. Serial No. 640,798.

*To all whom it may concern:*

Be it known that I, WALTER WRIGHT, a citizen of the United States, residing in New York, in the county of New York and State of New York, have invented certain new and useful Improvements in Combined Type-Writing and Computing Machines, of which the following is a specification.

This invention relates to machines of the type in which a series of computing wheels or devices is provided with tens-carrying trains for transmitting movement from wheel to wheel, and particularly to machines of this class, in which a master wheel is provided for the computing wheels, and in which relative step-by-step movement is effected between the master wheel and the computing wheels.

One of the main objects of the invention is to provide simple and efficient devices for carrying tens from wheel to wheel. Each computing wheel is associated with a Geneva lock pinion, and the latter is coupled to a second pinion of ordinary construction, which meshes with a gear provided on the computing wheel of next higher denomination, so that the latter is given one-tenth of a revolution at each revolution of the first computing wheel. The coupling device is movable out of engagement with the pinions, so that at a certain point in the gang of computing wheels a break may be made in the tens-carrying trains. The coupling devices in the present instance consist of a series of loose collars mounted on a rod and passing through the pinions, either the pinions or the rod being adapted to be connected to the letter-feeding carriage of a typewriter for effecting relative movement between the coupling collars and the pinions, the latter fitting loosely upon the collars. Means are provided to prevent accidental rotation of the pinions which have moved out of engagement with the collars.

Said devices are shown in connection with two computing heads, one adapted to be connected directly to the carriage of a typewriter to coöperate with the non-traveling master wheel, and the other adapted to have a fixed position on the typewriter to coöperate with the master wheel that travels with said carriage.

Other features and advantages will hereinafter be pointed out.

In the accompanying drawings, Figure 1 is a front elevation of an Underwood typewriting and computing machine provided with the present improvements. Fig. 2 is a perspective rear view of the wheel carrying arbors or members, etc. Fig. 3 is a detail of a bar or rib to lock the pinion couplers against accidental rotation when out of use. Fig. 4 is a sectional side elevation showing a computing wheel, tens carrying pinion and devices on which they are mounted. Fig. 5 is a front elevation of a gang or system of computing wheels and tens carrying trains. Fig. 6 is a sectional view of the computing wheel and tens carrying train. Fig. 7 is another sectional view of said devices. Fig. 8 is a longitudinal sectional view of the members seen at Fig. 5. Fig. 9 is still another view of the devices seen at Fig. 6. Fig. 10 is a perspective view of the computing wheel and its appurtenances. Fig. 11 is a perspective sectional view of the same. Fig. 12 is a perspective sectional view of another computing wheel and its connections, but looking in the opposite direction from Fig. 11. Fig. 13 is a perspective view of an ordinary pinion forming part of the tens carrying train. Fig. 14 is a perspective of the Geneva pinion to coöperate with the Fig. 13 pinion.

A machine in which the computing carriage travels as a unit with the typewriter carriage, is shown in Patent No. 1,095,060, dated April 28, 1914. Other machines having a computing carriage of this type are shown in British Patent No. 8740, dated April 20, 1909. In said British patent, and in British Patent No. 14,817, dated June 26, 1911, are shown suitable devices for causing a computing carriage to travel in a direction opposite to the typewriter carriage, but step by step therewith. For convenience, the present improvements are illustrated in the type of combined adding and typewriting machines shown in said patents, the typewriting part of the machine being of the Underwood type, and provided with the usual typewriter carriage 7. The invention is further shown in this combination in two forms, in one of which forms a computing or sub-carriage may be carried along step by step as a unit with said typewriter carriage, while, in the other form, a computing or sub-carriage may be moved along by said typewriter carriage, but in the opposite direction. In each form of the present invention, there is a relative step-by-step motion of a master wheel past a gang of computing wheels. The two computing carriages are shown in Fig. 1. In said figure, the upper computing or sub-carriage travels as a unit with the typewriter carriage, while the lower computing or sub-carriage may travel in the direction opposite to the typewriter carriage.

The present invention relates to improvements in the carrying devices, whereby tens are carried from wheel to wheel. Suitable means to cause relative travel between the master wheel and the computing wheels, are shown in my Patents No. 1,160,102, dated November 9, 1915, and No. 1,162,730, dated November 30, 1915; and in my pending applications Nos. 388,766, filed August 16, 1907; 428,020, filed April 20, 1908; and 574,813, filed August 1, 1910; and others, but the claims in this case are limited to specific devices not disclosed in said patents and applications.

The lower sub-carriage comprises a plate 69 and a similar plate 72, joined by tubes 73, 74, sliding upon upper and lower rails 70 and 71. Connected to this sub-carriage 69 is the master wheel 75, which is adapted to travel step-by-step with relation to a series of dial wheels 76, the latter contained in a casing 77, which is stationary and fixed upon the framework of the machine by means of a bracket comprising rods or bolts 78 and an end plate 78$^b$. Said master wheel is operated by its shaft 49. Above the computing head comprised in casing 77, is another computing head, comprising similar dial wheels 76, and a casing 79; said casing connected to the carriage 7 by arms 80, 81, and having rolls 82, 83, to run upon tracks 84, 85. These dial wheels are operated by the master wheel 86 which is fixed upon the shaft 50.

The mechanism in the upper adding head will now be described, it being understood that this adding head travels step-by-step with the carriage 7 of the typewriter, while the master wheel 86 does not travel. Each dial wheel 76 is shown provided on its side with a gear 77$^a$, the latter having a hub 78$^a$ upon which the dial wheel (or annulus) is fixed, Fig. 11. Said hub 78$^a$ has a bore which is fitted loosely upon a stationary tubular guide 87, Figs. 5, 8, 9, which is of the same diameter as the hub of the master wheel 86, the latter being mounted at the inner end of said tube 87, and having teeth 88 to engage the notches or teeth of an internal gear or pinion 89 formed in said hub 78$^a$ by notching the latter radially at 90. As the dial wheels travel step-by-step with the paper carriage 7, the master wheel 86 turns them in succession, each to an extent determined by the typewriter key operated at the moment.

Each gear 77$^a$ meshes with a tens-carrying pinion 91, which has a bore to fit loosely upon collars 94, the latter loose upon a fixed arbor or shaft 92. This pinion 91 can be rotated by means of the next dial wheel 76 on the right. The diameter of pinion 91 is half that of gear 77$^a$. Between said pinion 91 and said next dial wheel 76, is a ten-toothed transfer-pinion 93, having a Geneva lock relation with the cylindrical surface of dial wheel 76, and adjoining the pinion 91; pinion 93 being also loose on said shaft 92. Connection or combination, between adjoining pinions 91 and 93, is effected by means of the coupling collars 94, these collars being disposed along the shaft 92, and loose thereon, and having teeth 95 to mesh with internal teeth or notches 96, 97, formed in pinions 91 and 93 respectively, to key said pinions 91 and 93 together, so that they must rotate as though made in one piece; said collars 94 being slidable in axial direction within the row of pinions 91 and 93, the latter also having bores to fit loosely on said collars 94.

The Geneva-lock pinion 93 has alternate thin and thick or offset teeth 98, 99, the thin teeth 98 passing within an annular recess 100 between the wheel 77$^a$ and the rim portion of the dial wheel 76, Fig. 11. The circular periphery of the dial wheel 76 serves as an abutment for two of the beveled tips 101 of the thick or offset teeth 99, Figs. 6 and 7, to lock the Geneva pinion 93 against rotation; and since said pinion 93 is coupled by a collar 94 to a pinion 91, and since the latter is in mesh with the gear 77$^a$ of next higher denomination, it follows that all the dial wheels 76 to the left of the active dial wheel are locked against rotation. Upon said dial wheel 76 are formed or provided two similar adjacent gear teeth 102, constituting a mutilated gear, and filling a portion of the recess 100. When the dial wheel 76 rotates enough in either direction, that tooth 98 which at Figs. 6 and 7 is shown as pointing upwardly or toward the axis of the dial wheel 76, is engaged by the adjacent tooth 102, and the Geneva pinion 93 is turned. The adjacent offset tooth 99 on said Geneva pinion enters the notch between said teeth 102 (the dial wheel being recessed at 103 to receive the offset tooth 99). By means of this mutilated gear, the dial wheel 76, which rotates through one-tenth of a revolution, turns the Geneva pinion 93 through one-fifth of a revolution, and the latter reaches a position where it is again locked by means of its adjacent teeth 99, abutting against the periphery of the dial wheel 76, as at Figs. 6 and 7. This movement of the Geneva pinion 93 is transmitted through the coupling collar 94 to pinion 91 of next higher denomination, and the latter pinion, (which is one-half the diameter of the gear 77$^a$,) turns gear 77$^a$ through one-tenth of a revolution, whereby the associated dial wheel 76 is advanced one point.

The revolution of any dial wheel 76 may be effected by the master wheel 86 in any desired or suitable manner; and it will be understood, of course, that the particular dial wheel which is engaged by the master wheel, is unlocked, or out of control of the Geneva pinion of next lower denomination; such release being automatically effected by providing, at the right of the series of coupling collars 94, at Fig. 8, (or at the left in Fig. 11, which is a rear view), a special discoupling or dead collar 104, similar to collar 94, but unprovided with any coupling-teeth or keys 95; so that the pinion 91 which meshes with the active gear 77ª, i. e. the gear which is being rotated by the master wheel 86, may rotate idly and independently of the Geneva wheel of lower denomination, as it is uncoupled therefrom.

From the foregoing it will be understood that when any typewriter numeral key is operated, and the shaft 50 is rotated to an extent determined by such key, the master wheel 86 on said shaft, rotates that dial wheel 76 with which it is at that time in engagement; and that no movement of any other dial wheel occurs, unless the mutilated gear 102 on the active dial wheel (in engagement with the master wheel 86) operates the Geneva pinion 93 and hence the pinion 91 of higher denomination which is coupled thereto, whereby said pinion 91 turns the next dial wheel on the left a tenth of a revolution. This tens-carrying movement may extend to or occur concomitantly upon several of the dial wheels 76 of higher denominations.

As before explained, the adding head or sub-carriage 79 travels step-by-step with the main carriage 7, while the master wheel 86 does not travel; and it will be understood that the group or system of coupling collars 94 remains stationary while the adding head 79 travels so that the coupling collars engage the pairs of pinions 91 and 93 in succession. There are preferably enough of said coupling collars to enable tens to be carried at one operation along as many dial wheels 76 as are sufficient to make up a commercial totalizer. Fourteen collars are illustrated at Fig. 8, and these are sufficient for carrying tens along a series of say twelve computing wheels, when the latter are arranged in groups of three, as shown.

To limit the field of operation of the tens-carrying train, there is provided, at the left of the group of coupling collars, Fig. 8, a special collar 105, having the same diameter as the collars 94, but unprovided with coupling teeth or keys 95, so that when the Geneva pinion at the extreme left of the group is rotated by its dial wheel 76, it will rotate idly, since there is nothing to couple it to the pinion 91 of higher denomination. Thus a break is effected in the tens-carrying operation. Preferably the dial wheels are divided into groups of three, by means of partitions 106 fixed in the adding head. These partitions have annular flanges 107, and every third dial wheel 76 (or gear 77ª thereon) has an elongated hub 108, which may have a bearing or support in the partition 106, and in said flange 107; the last two members taken together being equal in thickness to the length of two letter spacing movements of the typewriter carriage. The internal teeth 89 may either be prolonged to extend through the hub portions 108, or, as shown at Fig. 8, they may be omitted from such hub portions. The group of coupling collars 94 is placed between the adjacent ends of two rigid rods 109, 110, projecting toward each other from end plates or brackets 111, 112, which are fixed upon the typewriter framework, and between which the adding-head or sub-carriage 79 travels; said end plate 112 having bearings for the master wheel shafts 50 and 49.

The shaft or arbor 92 (Fig. 8) upon which the coupling collars are loosely assembled, may serve as a fixture to join the inner ends of said rods or bars 109, 110; said shaft 92 being at its left hand end threaded at 113 to be screwed into the end of the rod 109; and being similarly threaded at its opposite end at 114 for screwing into the bar 110. These bars 109, 110 are provided with longitudinal keys or ribs 115, 116 corresponding in position and contour to the keys 95 on the coupling collars, so as to enter the notches 96, 97 in the plain pinions 91 and the Geneva pinions 93, to hold these pinions positively against rotation; that is, all of said pinions which may at any time be beyond or out of range of the group of devices comprising the coupling collars 94, and the dead washers or collars 104, 105.

The hub 117 of the Geneva pinion associated with every third dial wheel, is lengthened, to pass through the partition 106, whereby the groups of pairs of pinions, as at Fig. 8, may correspond in position with the groups of dial wheels. The length of dead collar 105 is preferably greater than that of the hub 117, so as to insure a break in the tens-carrying operation by not coupling this long hub to the next plain pinion as the adding head travels to the left, during which travel the coupled pinions pass one after another onto the bar 109, and off from the bar 110. While the coupling-ribs or keys 115 may in some cases be omitted, still it is preferred to employ them in order to secure accuracy of operation, especially where it is desired to use very small dial wheels. The keys 116 at the right, may also be omitted in some cases. They are preferably employed for the purpose of locking against possible rotation those pinions which are at the right of the dead collar 104, which, as before explained, causes a break in the locking train of pinions and gears. The dead collar 104 may be rigid or integral with the bar 110, as illustrated, and the dead collar 105 may also be integral with bar 109, if desired. Extending to the right from fixed bracket 111, is a fixed tube 118, in axial line with tube 87, and carrying a rib or key 119 to enter the internal notches 90 in the dial wheels, to lock against rotation those wheels which are at the left of the computing zone; said key 119 extending so far toward the right (Fig. 8) as to include the first dial wheel at the left of the group of coupling collars 94, or at least the first dial wheel which is at the left of the extreme left-hand coupling collar. The relation of the parts 119, 94 and 86 is constantly maintained, since these parts do not travel with the sub-carriage 79. At Fig. 8, the second dial wheel from the left is shown coöperating with that Geneva pinion 93 which turns loosely upon the dead collar 105, so that tens are not carried to the dial wheel shown at the extreme left of said Fig. 8; said extreme left-hand dial wheel, however, is under the control of the key 119. The next step of the computing-wheel carriage 79 to the left, will bring the second dial wheel under the control of the key 119, while the pinion 91 which is shown meshing with said second dial wheel, will be uncoupled from its adjoining Geneva pinion 93, the last-mentioned pinion being then free to rotate on the dead collar 105. Any pinion 91 which is out of control of the keys 95 or 115, is prevented from rotating by reason of its connection with that gear 77$^a$ which is locked by the key 119. Only one key 115 or 116 may be used, if desired, instead of the five keys illustrated. It will be understood that when the master wheel 86 rotates a dial wheel and comes to rest, the idly revolving pinion 91, meshing therewith, will be brought to rest in position for the key 116 to mesh with said pinion; and, if desired, all the keys 116 may be pointed, as seen at 120, Fig. 8, to enter more readily into the notches 96, 97 in the pinions.

In the right-hand end of the tube 118, Fig. 8, may be placed a bushing 121, to serve as a bearing for the inner end of the master-wheel shaft 50; while between the tube 118 and the master wheel, may be arranged a loose tube 122, having at its left-hand end a bushing 123, and at its right-hand end fitting upon a reduced portion of the hub of the master wheel 86; the outside diameters of the tubes 87, 122 and 118 being the same, so that the dial wheels may slide freely thereover. This intermediate tube 122 is secured by pin 124 to the master wheel 86, so as to rotate therewith.

Projecting toward the left from the sub-carriage or traveling adding head 79, Fig. 2, and fixed to the end thereof, is a key 125, fitting between the keys 95 on the coupling collars 94, to hold the latter when the paper carriage 7 is returned to the right to begin a new line of writing, at which time many of the coupling-collars may be exposed outside of the adding head, as seen at Fig. 1. This key 125 prevents the collars from accidentally turning to positions out of line with the notches 96, 97, in the pinions. The plate or bracket 111 may be perforated, as shown at 126, to make a passage-way for said key. If desired, a rib or key 127, Fig. 8, may be provided upon the fixed tube 87 to engage the internal gears or notches 90 of the dial wheels at the right of the master wheel 86, to prevent said wheels from shaking, and the key 127 would be especially useful if all of the keys 116 were omitted; said key 127 extending to the left sufficiently to lock all of the adding wheels that may stand to the right of the master-wheel teeth 88.

From the foregoing description, the operation of the train of computing wheels in the fixed adding head 77 will also be understood. The master wheel 75 is splined upon shaft 49, which is rectangular in cross-section. The master wheel 75 is confined between the ends of fixed tubes 129, 130, projecting inwardly toward each other from arms 69, 72; and said master wheel 75 may have bearings in the ends of said tubes. The master wheel 75 hence is adapted to travel with the members 69, 72. The latter are rigidly connected by a shaft or arbor 131, corresponding to the shaft 92 in the upper adding head; and upon this arbor 131 are loosely mounted coupling collars 94$^x$ similar to collars 94. At the right of said coupling collars is provided a bar 110$^x$ having teeth or keys similar to keys 116; and said bar may serve the same purpose and be connected to the shaft 131 in the same manner as already described in connection with the totalizer 79. At its left hand end, said shaft or arbor 131 may be provided with a dead collar 117$^x$. There is no necessity of providing a keyed bar or rod similar to rod 109 at the left of said dead collar 117$^x$, because the travel of the master-wheel carriage 69, 72 is so limited, that such rod is unnecessary; the collars 94$^x$ not needing to pass to the right out of mesh with the left-hand pinions in the set. The casing of the adding head 77 may be provided with a bar 125$^x$ to serve as a key for the coupling collars 94$^x$, when the latter emerge from the casing 77.

Having thus described my invention, I claim:

1. A computing mechanism comprising computing wheels, each having a circular periphery, and tens-carrying devices, the latter each comprising a pinion mounted so that alternate teeth thereof are engageable two at a time by the periphery of the associated computing wheel, to lock said pinion against rotation, and so that one of the intervening teeth normally stands radially across said periphery, each computing wheel having a mutilated gear portion at its periphery to coöperate with all the teeth on its pinion to rotate the latter intermittently, a gear coaxial with each pinion and engaging the next higher computing wheel, and means to cause the pinion and gear to turn as one.

2. A computing mechanism comprising computing wheels each having a smooth circular periphery, and tens-carrying wheels, the latter each comprising a pinion mounted so that the alternate teeth thereof overlap said periphery and are engageable two at a time by said periphery to lock said pinion against rotation, other teeth on said pinion by which it is positively driven in carrying-over, said computing wheel having at least one tooth to coöperate with all the teeth on said pinion to rotate the same intermittently, and means for releasably gearing said pinion to the computing wheel higher in denomination.

3. A computing mechanism comprising computing wheels, each having a circular periphery, and tens-carrying devices, the latter each comprising a pinion mounted so that alternate teeth thereof are engageable two at a time by the periphery of the associated computing wheel to lock said pinion against rotation, and so that one of the intervening teeth normally stands radially across said periphery, each computing wheel having a mutilated gear portion at its periphery to coöperate with all the teeth on its pinion to rotate the latter intermittently, each tens-carrying device also comprising a second pinion rotated by the first pinion, a gear meshing with each last-named pinion and connected to the next higher computing wheel, said tens-carrying pinions separately rotatable, and means to cause them to rotate together in pairs.

4. A computing mechanism comprising computing wheels, each having a circular periphery, and tens-carrying devices, the latter each comprising a pinion mounted so that alternate teeth thereof are engageable two at a time by the periphery of the associated computing wheel to lock said pinion against rotation, and so that one of the intervening teeth normally stands radially across said periphery, each computing wheel having a mutilated gear portion at its periphery to coöperate with all the teeth on its pinion to rotate the latter intermittently, each tens-carrying device also comprising a second pinion forming a pair with said first pinion and rotated thereby, a gear meshing with each last-named pinion and connected to the next higher computing wheel, and coupling devices for the pairs of pinions, said alternate teeth passing between the gear and the computing wheel.

5. A computing mechanism comprising computing wheels, each having a circular periphery, and tens-carrying devices, the latter each comprising a pinion mounted so that alternate teeth thereof are engageable two at a time by the periphery of the associated computing wheel to lock said pinion against rotation, and so that one of the intervening teeth normally stands radially across said periphery, each computing wheel having a mutilated gear portion at its periphery to coöperate with all the teeth on its pinion to rotate the latter intermittently, each tens-carrying device also comprising a second pinion forming a pair with said first pinion and rotated thereby, a gear meshing with each last-named pinion and connected to the next higher computing wheel, and coupling devices for the pairs of pinions, said alternate teeth passing between the gear and the computing wheel, the latter in the form of an annulus secured upon a hub with which the gear is provided.

6. A computing mechanism, comprising computing wheels; and tens-carrying devices, the latter each embodying a pair of pinions, one of which has alternating wide and narrow teeth, the wide teeth engaging the periphery of the associated computing wheel two at a time, to lock the same against rotation, and the narrow teeth arranged to project radially across the face of said computing wheel, each computing wheel having a mutilated portion at its periphery to coöperate with both the wide and the narrow teeth of its associated pinion, to rotate the latter intermittently, a gear meshing with the other pinion of the pair and connected to the next higher computing wheel, and coupling means for the pairs of pinions.

7. A computing mechanism, comprising computing wheels, each provided at one side with a gear, and with a circumferential groove co-axial with said gear; and tens-carrying devices comprising, each, a pair of separate pinions, and connecting means therefor, one pinion of each pair having alternating wide and narrow teeth, the wide teeth overlapping the groove of the associated computing wheel and engaging the periphery thereof two at a time, to lock said wheel against rotation, and the narrow teeth arranged to project radially into the groove in said computing wheel, each computing wheel having a mutilated gear portion which is disposed in said groove to coöperate with both the wide and the narrow teeth of its associated pinion, to rotate the latter intermittently; the other pinion of each pair meshing with the gear on the next higher computing wheel.

8. A computing mechanism, comprising computing wheels, each provided at one side with a gear, and with a circumferential groove co-axial with said gear; and tens-carrying devices comprising, each, a pair of separate pinions, and connecting means therefor, one pinion of each pair having alternating wide and narrow teeth, the wide teeth overlapping the groove of the associated computing wheel and engaging the periphery thereof two at a time, to lock said wheel against rotation, and the narrow teeth arranged to project radially into the groove in said computing wheel, each computing wheel having one wall of its said groove provided with a pair of laterally-projecting teeth adapted to coöperate with both the wide and the narrow teeth of its associated pinion, to rotate the latter intermittently, said laterally projecting teeth having a recess therebetween for the reception of the said wide teeth; the other pinion of the pair meshing with the gear on the next higher computing wheel.

WALTER WRIGHT.

Witnesses:
K. FRANKFORT,
G. S. YOUNG.

Copies of this patent may be obtained for five cents each, by addressing the "Commissioner of Patents, Washington, D. C."